Aug. 25, 1964  C. D'AMELIO  3,145,566
METER FOR MEASURING THE RATE OF FLOW BY WEIGHT OF A FLUID
Filed March 16, 1959
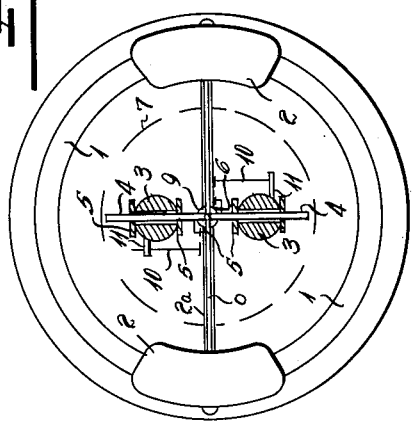
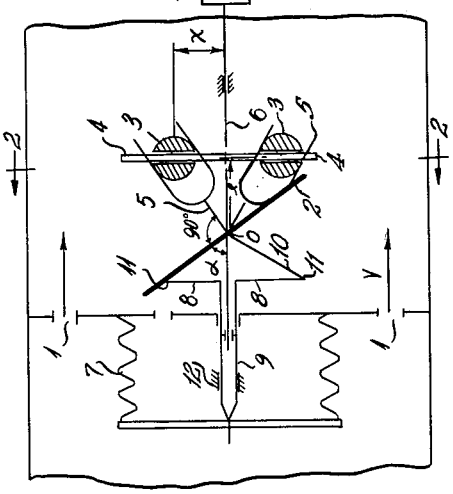
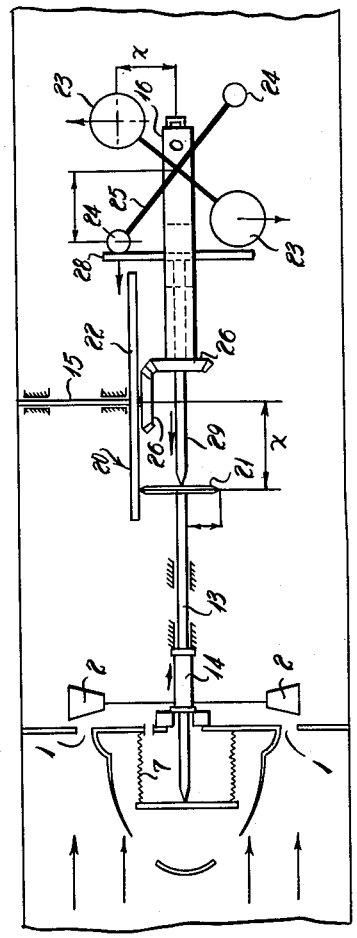
INVENTOR
Carlo d'Amelio
BY
ATTORNEYS

United States Patent Office 3,145,566
Patented Aug. 25, 1964

3,145,566
METER FOR MEASURING THE RATE OF FLOW BY WEIGHT OF A FLUID
Carlo d'Amelio, Naples, Italy, assignor to Rockwell Manufacturing Company, Pittsburgh, Pa., a corporation of Pennsylvania
Filed Mar. 16, 1959, Ser. No. 799,684
Claims priority, application Italy Apr. 1, 1958
13 Claims. (Cl. 73—230)

The present invention relates to a device for measuring the rate of flow of a fluid by weight, and more particularly to an improved metering apparatus which actuates a revolving shaft whose angular velocity $\omega$ measures in each moment the rate of flow by weight of a fluid with a density variable in time, whereas the number of revolutions performed by this shaft in a given interval of time measures the quantity by weight of the fluid which has passed through the apparatus in the same interval of time.

Fluid flow measuring meters have long been known which use vanes for driving a rotating shaft to provide a measure of the flow of fluids, but such meters have a serious deficiency in that they do not compensate for changes in density of the fluid.

It is a major object of this invention to provide a fluid measuring apparatus which actuates a revolving shaft in accordance with the velocity of the passage of the fluid through a given area, and this shaft velocity is continuously varied to be proportional to the density of the fluid.

The invention will now be described with reference to the annexed drawings which represent by way of non-limitative example two preferred embodiments thereof.

FIGURE 1 is a schematic side elevation view in longitudinal section of a measuring device according to the invention;

FIGURE 2 is a front elevation view of the device in FIGURE 1 and is taken substantially along line 2—2 of FIGURE 1; and FIGURE 3 represents a schematic view in longitudinal section of a second embodiment of the invention.

Referring now to FIGURES 1 and 2, the meter comprises essentially an outer conduit confining the fluid flow in the direction of the arrows in FIGURE 1 through fixed apertures 1 of a given size. As best shown in FIGURE 2, a plurality of vanes 2 (two only being illustrated) are provided to drive a revolving shaft 6. The meter indicator 6a is driven by shaft 6.

Vanes 2 are suitably mounted on rods having an axis O to rotate in a plane perpendicular to the axis of shaft 6. Vanes 2, in this embodiment, are further mounted for pivotal movement about axis O so that angle $\alpha$ may be varied by means next described.

Attached to revolving shaft 6 are rods 4 which extend radially from shaft 6 and rotate in a plane perpendicular to the axis of shaft 6. Flyweights 3 are mounted to slide along rods 4 due to centrifugal force caused by rotation of rods 4 about the axis of shaft 6. Yokes 5 are provided between flyweights 3 and sleeves 2a. Each of the sleeves 2a is rigidly secured to a blade 2 and both the sleeves and the blades to which they are secured are mounted for pivotal movement about axis O (FIGURE 1) so that the angle $\alpha$ and the distance $x$ as shown in FIGURE 1 have a definite and fixed geometrical relationship.

The angle $\alpha$ of each blade 2 is also under the influence of the position of a bellows or piston 7, the displacement of which is transmitted through a stem 9 which is axially slidable relative to and along shaft 6. Attached to stem 9 are two brackets 8, each of which is connected to a lever 11. Each lever 11 is connected to control the pivotal movement of the associated vane 2 through an arm 10 (one of the arms 10 is in the same plane as blade 2 and hence not shown in FIGURE 1). Stem 9 and the members 8, 10 and 11 which are fixed to it rotate at the same speed as blades 2 and shaft 6 since arms 10 are connected to sleeves 2a and stem 9 is rotatively mounted in bearing member 12.

With continued reference to FIGURES 1 and 2, if a pressure difference $\Delta p$ provokes the flow of a fluid through a given section or opening 1, the velocity V of the flow of the fluid is given, for the slight pressure differences occurring in flow meters, by the formula $$V=\sqrt{2g\frac{\Delta p}{y}}$$

wherein $y$ is the specific weight of the fluid, so that $$\Delta p = V^2 S/2 \qquad (1)$$

wherein $$S=\frac{y}{g}$$

is the density of the fluid and $g$ is the acceleration due to gravity.

The flow of the fluid at velocity V drives blades 2 which have a variable angle of incidence to the direction of flow and are mounted to pivot about the axis O perpendicular to the axis of rotation. In FIGURE 1, only one blade 2 is shown and it is there illustrated as being perpendicular to the plane of the drawing. There are, however, preferably a plurality of blades, the pivotal position about axis O of all blades 2 being equally controlled. Let $\alpha$ be the angle of the blade (which, for the sake of simplicity, we shall assume to be flat) to the direction of flow, which we shall assume to be axial.

The peripheral velocity V' of the helix, or the velocity $\omega$ proportional thereto, will be derived from the velocity of flow of the fluid according to the known formula:

$$\omega = kV' = kV \tan \alpha$$

wherein $k$ is a proportionality constant dependent upon the dimensions of the parts of the apparatus. This equation is valid for blade angles ranging from 0° to the stall angle of the particular meter blades involved. Normally, blade angles are employed which lie in the range lying between these limits. A more complete discussion of the derivation and significance of this formula is set forth in copending application No. 717,863, filed February 9, 1958, assigned to the assignee of the present invention, to which reference may be had if deemed necessary. In other words, tan $\alpha$ is the ratio of proportionality between $\omega$ and V, or, $$\frac{\omega}{kV}=\tan \alpha$$

This ratio, or the value of tan $\alpha$ which is the same thing, is established by the distance $x$ of one or more flyweights 3 sliding along the rods 4 perpendicular to the axis of rotation 6 and driven by the latter, so that $$x = \cotan \alpha = 1/\tan \alpha = \frac{kV}{\omega}.$$

The flyweights act on the blades, orientating them by means of the yoke 5.

Let $l$ be the distance between the base of rod 4 and the base of the axis of rotation O for each blade. This distance, for the sake of simplicity, may be assigned a value of 1. The force tending to rotate vanes 2 about axis O of FIGURE 1 due to the centrifugal force of the flyweight resulting from an angular velocity $\omega$ of shaft 6 will be opposed by a centripetal force Fc derived from the presure difference $\Delta p$, which has provoked the flow of the fluid. This centripetal force acts through bellows or piston 7 and is transmitted through stem 9 of the piston or bellows, bracket 8 on stem 9, and lever 11 on the arm 10 which is in the same plane as blade 2 (which in FIGURE 1 is shown superimposed on the blade). Arm 10 and yoke arm 5, which is at right angles to the plane of blade 2, are rigidly connected to sleeve 2a. By means of the yoke 5, the centripetal force Fc acts upon the centrifugal flyweight 3 sliding along rod 4 in opposition to the centrifugal force.

For the sake of simplicity, the length of bracket 8 will also be assigned a value of 1.

It is easily shown that, in the condition of equilibrium, the angular velocity of the shaft of the helix continually measures on a given scale the rate of flow by weight of the fluid. Indeed, beginning with Formula 1

$$\Delta p = V^2 S/2 \qquad (1)$$

let F be the centrifugal force acting on the mass M, the sum of the masses of weights 3, rotating at an angular velocity $\omega$ at a distance $x$ from the said shaft; then $$F = M\omega^2 x \qquad (3)$$

And let Fc be the centripetal force opposing and balancing the centrifugal force, which results from the difference of pressure $\Delta p$ acting on an area, A, and is transmitted in the manner described above to the flyweight 3, so that $$Fc = A\Delta p = AV^2 S/2 \qquad (4)$$

In the state of equilibrium, F must be equal to Fc, or, in other words: $M\omega^2 x = AV^2 S/2$. But $$x = \frac{1}{\tan \alpha}$$

and $$V = \frac{\omega}{k \tan \alpha} \qquad (2)$$

Substituting these values of $x$ and $V$ into Equation 4 and simplifying, $$\tan \alpha = \frac{AS}{2Mk^2}$$

Next, substituting this value of $\tan \alpha$ into Equation 2 and rearranging, $$\omega = \frac{VSA}{2Mk} \qquad (5)$$

The weight rate of flow of the fluid through the meter in pounds per second $$Vw = VA_1 Y \qquad (6)$$

where V is the velocity of the flow through openings 1, Y is the specific weight of the fluid, and $A_1$ is the total cross sectional area of the openings 1.

Solving Equation 5 for V and substituting into Equation 6, $$V_w = \frac{2\omega M k A_1 Y}{SA} \qquad (7)$$

Since $$\frac{Y}{S} = g$$

Equation 7 may be simplified to $$V_w = \frac{\omega 2g M k A_1}{A} = \omega \left(\frac{2g M k A_1}{A}\right) \qquad (8)$$

For any given meter M (the total mass of flyweights 3), A (the area of the exposed end of bellows 7), proportionality constant $k$, and $A_1$ (the total area of openings 1) are constants. The remaining terms in the parenthesis are all constant. Therefore, the terms in the parenthesis may be combined into a constant C′ and Equation 8 may be reduced to $$Vw = C'\omega \qquad (9)$$

where C′ is a constant for a given meter. From Equation 9 it is apparent that shaft 6 revolves at an angular velocity $\omega$ directly proportional to the weight rate of flow of the fluid through the meter. Over a given time interval, therefore, the number of revolutions of shaft 6 will be directly proportional to the weight of the fluid passed through the meter in that interval.

If the fluid density varies during the time interval, it will upset the equilibrium between force F and $F_c$, producing a resultant force $\Delta F$. Force $\Delta F$ will rotate sleeves 2a, changing the angle of attack $\alpha$ of blades 2 to compensate for the variation in density. Changing the angle of attack $\alpha$ will alter the angular velocity $\omega$ of blades 2, varying the magnitudes of forces F and $F_c$ and bringing them again into equilibrium. Thus, density variations will be closely followed by compensating changes in the rotational velocity $\omega$ of blades 2 and shaft 6. Therefore, even though the fluid density varies, indicator 6a will reflect the weight rate of flow and/or, for a given time interval, the weight of fluid passed through the meter.

The same result can be obtained in other ways based on the same principle. One of these is represented in FIGURE 3. In this drawing the helix 2 has a fixed pitch, rather than a variable pitch as in the case of the embodiment described in connection with FIGURES 1 and 2. Therefore its angular velocity is in constant ratio to the velocity of the fluid flowing from the apertures 1. In other words, helix 2 constantly measures the volumetric rate of flow of the fluid. Revolving shaft 13 is driven by helix 2, but shaft 13 can slide axially in the hub 14 of the helix. Shaft 13 drives friction wheel 21 of a continuously variable speed changer 20. Shaft 15 of speed changer 20 drives a centrifugal governor by means of the pair of bevel gears 26. Such a governor comprises flyweights 23, rod 25 and roller 24 for sliding bracket 28 and shaft 29 axially relative to shaft 16. The force on shaft 29 due to the action of flyweights 23 is counterbalanced by the thrust of the bellows or piston 7, under the action of the pressure difference $\Delta p$ which causes the fluid flow. Thrust from bellows 7 forces shaft 13 axially to decrease the distance $x$.

The assembly is of such proportions that the distance of the drive wheel 21 of the friction-type continuous speed changer 20 from the axis of rotation 15 of the driven wheel 22 is constantly equal or proportional to the distance of the flyweights 23 from the axis of the meter shaft 16 which drives them. The velocity $\omega$ of shaft 16, or the velocity of shaft 15, which is the same thing, drives a conventional register to provide a measure on a given scale of the rate of flow by weight of the fluid.

In both cases, it has been assumed that the thrust of the fluid on the helix is null. This is permissible since any such thrust may be counterbalanced by suitable supports so that the said thrust will not affect the equilibrium mentioned above.

Shaft 13, which measures the volumetric flow, can be driven by any known rotary volumetric flow meter, as for example, a rotary piston meter, a membrane meter, etc., whereas the bellows or piston 7 can be driven by the difference of pressure between peak and valley of a diaphragm or nozzle situated in the pipe which feeds the volumetric meter.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a fluid meter for measuring the rate of fluid flow by weight:
   (a) a single set of rotor blades;
   (b) a rotor structure mounting said blades for rotation in response to the flow of fluid therethrough in a plane generally normal to the path of fluid flow;

(c) a rotatable member driven by rotation of said blades and adapted to be connected to means responsive to the rotational velocity of said member for indicating the weight rate of fluid flow through said meter;

(d) means for generating a pressure differential proportional to the fluid density in the fluid flow upstream of said rotor blades;

(e) means producing a first control force having a magnitude substantially proportional to the magnitude of said pressure differential;

(f) means producing a centrifugal second control force having a magnitude substantially proportional to the square of the angular velocity of said rotor blades; and (g) means controlled by said first and second control forces acting in opposition to each other and operable to maintain said forces in a condition of balance by regulating the speed of said rotor to compensate for the effect of variations in the density of the fluid being metered.

2. In a fluid meter for measuring the rate of fluid flow by weight:

(a) a rotatably mounted metering element rotatable in response to the movement of fluid through said element and adapted to be connected to means responsive to the rotational velocity of said metering element for indicating the weight rate of fluid flow through said meter;

(b) means including means for causing a pressure differential proportional to the fluid density in the fluid flow upstream of said metering element for directing fluid to be metered through said element; and (c) means for controlling the speed of said metering element to compensate for variations in the density of the fluid being metered, comprising:

(1) means for producing a first control force derived from the rotation of and substantially proportional to the square of the angular velocity of said metering element;

(2) means for producing a second control force having a magnitude substantially proportional to the magnitude of said pressure differential; and (3) means for coordinating and balancing said first and second forces to control the speed of rotation of said metering element to compensate for variations in the density of the metered fluid.

3. In a fluid meter for measuring the rate of flow of fluid by weight:

(a) a metering rotor mounted for rotation in response to movement of fluid therethrough;

(b) means for directing fluid to be metered through said metering rotor including means for causing a pressure differential proportional to the fluid density in the fluid flow upstream of said metering rotor;

(c) a rotatable member driven by said metering rotor and adapted to be connected to means responsive to the rotational velocity of said member for indicating the weight rate of fluid flowing through said meter; and (d) means concomitantly responsive to a force derived from and substantially proportional to the square of the angular velocity of said rotor and an opposing force derived from and having a magnitude substantially proportional to the magnitude of said pressure differential for controlling the speed of said member to compensate for variations in the density of the metered fluid on the registration of the rate of flow.

4. The meter as defined in claim 3, wherein:

(a) the means for causing said pressure differential comprises at least one restricted section upstream of said rotor through which the fluid to be metered flows; and (b) the force proportional to the magnitude of said pressure differential is provided by means responsive to the pressure difference through said section.

5. In a fluid meter for measuring the rate of flow of fluid by weight:

(a) a rotatable peripherally bladed rotor rotatable in response to movement of fluid through its blades and adapted to be connected to means responsive to the rotational velocity of said rotor for indicating the weight rate of fluid flowing through said meter;

(b) means for directing the fluid to be metered through said rotor blades including means for causing a pressure differential proportional to the fluid density in the fluid flow upstream of said rotor; and (c) means for varying the angle of inclination of said blades with the rotational axis of said rotor in response to a first force derived from and substantially proportional to the square of the angular velocity of said rotor and an opposing force derived from and substantially proportional to the magnitude of said pressure differential for controlling the speed of said member to compensate for variations in the density of metered fluid on the registration of the rate of flow.

6. In a fluid meter for measuring the rate of flow of fluid by weight:

(a) a rotatable peripherally bladed rotor rotatable in response to movement of fluid through said blades;

(b) means for directing the fluid to be metered through said rotor blades substantially axially of the rotational axis of said rotor including means for causing a pressure differential proportional to the fluid density in the flowing fluid upstream of said rotor;

(c) a rotatable member driven by said rotor and adapted to be connected to means responsive to the rotational velocity of said member for indicating the weight rate of fluid flowing through said meter;

(d) a centrifugal governor mounted for rotation with said member about the axis thereof, said governor having a plurality of flyweights movable radially with respect to the member rotational axis;

(e) means producing a force having a magnitude substantially proportional to the magnitude of said pressure differential; and (f) means for coordinating said pressure-differential-derived force in opposition to the centrifugal force derived from rotation of said governor to govern the speed of said member in such a manner that the ratio of fluid velocity generated by said pressure differential to the angular velocity of said member is established by the distance of said flyweights from the member rotational axis when the centrifugal force derived from said flyweights and the force produced by said pressure differential are in equilibrium.

7. The meter defined in claim 6 wherein means are provided for varying the pitch of said blades in response to said coordinated and opposing forces produced by said pressure differential and said governor.

8. The meter as defined in claim 7 wherein the means for establishing the force produced by said pressure differential comprises a bellows disposed upstream from said rotor and compressible by the said pressure differential, and means operable upon compression of said bellows to oppose the centrifugal force exerted by said governor.

9. The meter as defined in claim 8 wherein a first linkage including an arm interconnects said fly-weights with said blades, and said means operable by said bellows comprises a stem axially shiftable coaxial with the rotor rotational axis by expansion and compression of said bellows, and a second linkage connecting said stem to said arm.

10. The meter as defined in claim 6 wherein said rotor blades are constant pitch blades.

11. The meter as defined in claim 10 wherein the means for establishing the force produced by said pressure difference comprises a bellows disposed upstream from said rotor and compressible by the said pressure difference, and means operable upon compression of said bellows to oppose the centrifugal force exerted by said governor.

12. The meter as defined in claim 11, a gradual speed changer having an input connected to said bellows and an output connected to said governor.

13. The meter as defined in claim 12 wherein said gradual speed changer comprises a rotatable shaft, a driving wheel rotatable with said shaft, a rotatable driven wheel normal to driving wheel rotational axis, said driving wheel being operable to rotate said driven wheel by friction.

References Cited in the file of this patent

UNITED STATES PATENTS

| | | |
|---|---|---|
| 2,097,360 | Andrew | Oct. 26, 1937 |
| 2,870,634 | Gehre | Jan. 27, 1959 |
| 2,896,084 | MacDonald | July 21, 1959 |
| 2,941,402 | Scanes | June 21, 1960 |
| 2,961,874 | Granberg | Nov. 29, 1960 |
| 3,063,295 | Dowdell | Nov. 13, 1962 |

FOREIGN PATENTS

| | | |
|---|---|---|
| 744,852 | Great Britain | Feb. 15, 1956 |